United States Patent [19]
Stirtz

[11] Patent Number: 4,679,347
[45] Date of Patent: Jul. 14, 1987

[54] FISHING FLASHER

[76] Inventor: Ronald H. Stirtz, 1660 Lorane Hwy., Eugene, Oreg. 97405

[21] Appl. No.: 747,862

[22] Filed: Jun. 24, 1985

[51] Int. Cl.$^4$ ............................................. A01K 85/00
[52] U.S. Cl. .................................... 43/43.1; 43/42.2; 43/42.17
[58] Field of Search ................. 43/42.14, 42.16, 42.17, 43/42.18, 42.19, 42.20, 42.46, 42.47, 43.1, 42.05, 42.12

[56] References Cited

U.S. PATENT DOCUMENTS

| | | |
|---|---|---|
| 777,862 | 12/1904 | Rhodes . |
| 885,861 | 4/1908 | Pepper . |
| 1,822,785 | 9/1931 | Petrie . |
| 1,933,170 | 10/1933 | Greider ............................. 43/42.16 |
| 1,993,868 | 3/1935 | Thornberg . |
| 2,439,621 | 4/1948 | Himottu ............................ 43/42.16 |
| 2,708,805 | 5/1955 | Garvie .............................. 43/42.19 |
| 3,245,171 | 4/1966 | Henry ............................... 43/42.14 |
| 3,500,573 | 3/1970 | Hudson ............................. 43/42.2 |
| 3,862,510 | 1/1975 | Peterson . |
| 3,864,202 | 6/1976 | Ruppa . |
| 3,990,171 | 11/1976 | Davis ............................... 43/42.17 |
| 4,382,345 | 5/1983 | Bassett ............................. 43/42.17 |

Primary Examiner—M. Jordan
Attorney, Agent, or Firm—Kolisch, Hartwell & Dickinson

[57] ABSTRACT

A fishing flasher exhibiting enhanced down-flash characteristics includes an elongate, resilient blade having a pair of substantial equal length blade segments extending outward to either side of a fold-line. A line-receiving aperture extends through the blade adjacent the fold-line. The blade segments are constructed and arranged to resiliently deform when drawn through the water to bring trailing portions of the blade segments toward each other. Trailing portions of the blade segments include reflector surfacing on facing sides of the trailing portion which are brought into substantial parallelism with the blade segments deformed while being drawn through a body of water.

11 Claims, 6 Drawing Figures

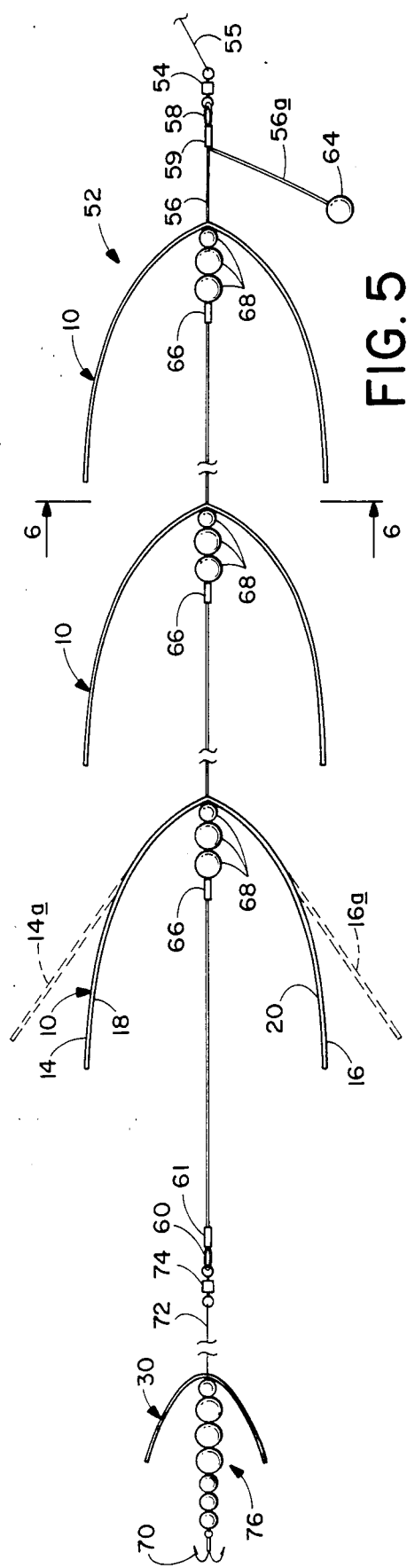
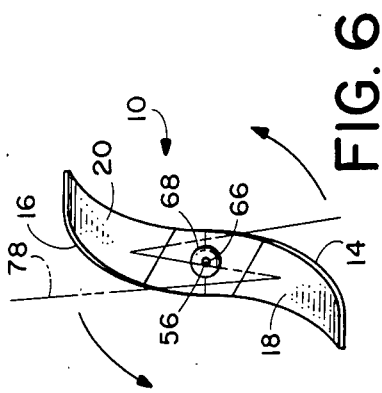
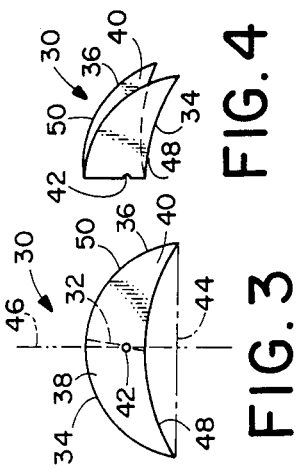
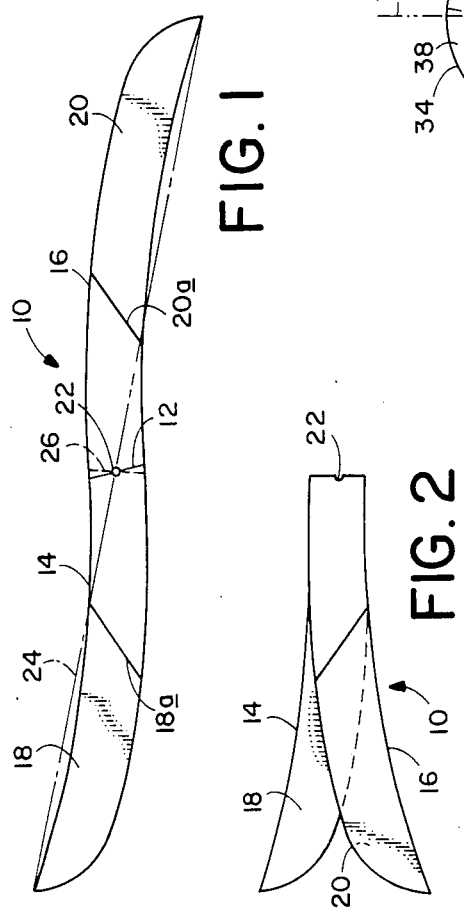
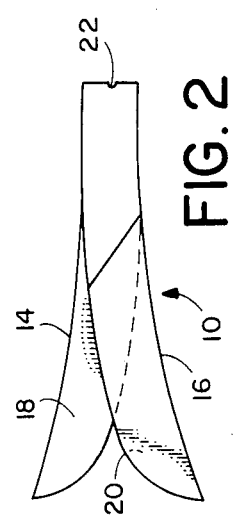

FISHING FLASHER

BACKGROUND AND SUMMARY OF THE INVENTION

The instant invention pertains to fishing lures and particularly to a fishing flasher which exhibits enhanced down flash characteristics. The flasher also has substantially reduced drag in comparison to known flashers.

Known fishing lures utilize several means for promoting down flash, which is thought to attract fish to a lure. One means is to utilize faceted, transparent beads which will internally refract light and transmit a beam of light, which enters the water and bead from the air above, and which tends to disperse the light throughout the water. Another form of lure is a flasher, or spinner which may have a faceted face, and which will rotate about a line when drawn through the water, again gathering light from above the water surface and dispersing it through the water. Both of these known means suffer certain disadvantages in that the first mentioned disperses a single light beam into many light beams of weaker intensity and the second generally produces only side flashes and is not capable of directing a light flash directly below the lure. To produce a significant amount of light flash, the lures are fairly large and rigid, which results in excessive drag as the lure is drawn through the water and which can, in turn, cause premature fatigue in the fisherman, and which greatly reduces the ability of the angler to feel strikes or to enjoy the feel of the fish after hooking one. Additionally when conventional lures are used as part of a trolling rig a rudder is required to prevent line twist at trolling speeds, adding to the drag produced by the lure.

An object of the instant invention is to provide a fishing flasher which has enhanced down flash characteristics.

Another object of the invention is to provide a fishing flasher which is flow formed by the water as the flasher is drawn through the water. Blades in the flasher thus shaped by the water produce much less drag than conventional, rigid blades.

A further object of the invention is to provide a flasher which exhibits little drag when drawn through the water.

Another object of the invention is to provide an integral structure for inhibiting rotation of a fishing line.

Yet another object of the invention is to provide a fishing flasher which is inexpensive, which is easy to manufacture, and which is durable in use.

Another object is to provide a fishing lure which allows the angler to vary the action of his lure in a simple means.

The fishing flasher of the instant invention includes an elongate, resilient blade having a transverse fold-line intermediate its end which defines a pair of substantially equal length blade segments extending outwardly to either side of the fold line. An aperture for receiving the line extending through the blade adjacent the fold line is provided. The blade segments are constructed to resiliently deform when drawn through the water to bring trailing portions of the blade segments toward each other. The blade segments include reflective means on the facing sides of the trailing portions of the segments and, with the blade segments deformed, the reflective means is operable to produce down flash as the blade is drawn through a body of water.

These and other objects and advantages of the instant invention will be more fully appreciated as the description which follows is read in conjunction with the drawings.

DESCRIPTION OF THE DRAWINGS

FIG. 1 is a plan view of a fishing flasher blade constructed according to the instant invention.

FIG. 2 is a view of the blade of FIG. 1 having been folded along a transverse fold-line.

FIG. 3 is plan view of a modified form of a fishing flasher blade constructed according to the invention.

FIG. 4 is a view of the blade of FIG. 3 folded along a transverse fold-line.

FIG. 5 is a side view of a fishing lure utilizing the blades of FIGS. 1 through 2 and showing these blades as deformed when submersed and pulled through a body of water.

FIG. 6 is a rear view of the blades of the lure taken generally along the line 6—6 of FIG. 5.

DETAILED DESCRIPTION OF THE INVENTION

Turning now to the drawings, and initially to FIGS. 1 and 2, a fishing flasher blade constructed according to the invention is shown generally at 10. Blade 10 is an elongate, resilient structure having a transverse fold-line or axis 12 located intermediate its ends. Line 12 defines a pair of substantially equal length, flat faced blade segments 14, 16 which extend outwardly to either side of fold line 12. Reflective means or surfacing 18, 20 are provided on segments 14, 16, respectively.

In the preferred embodiment, the reflective surfaces extend from lines 18a, 20a over approximately the outer $\frac{3}{4}$ of the length of the blade segments of what ultimately becomes inner surfaces of the blade segments. Surfaces 18, 20 may be multi-planar, producing what is referred to herein as a variegated down-flash. A reflective surface may also be included on the outer surfaces of blade 10.

An aperture 22 is provided adjacent fold-line 12. Aperture 22 is also referred to herein as mounting means or central mounting portion and provides a means for receiving a braided wire leader through blade 10. Aperture 22 may be located at the midpoint of fold-line 12, equidistant between the sides of blade 10.

Blade 10 as thus far described is a generally S-shaped planar structure having substantially parallel faces before deformation. A major axis 24 extends between the ends of blade 10. A transverse axis 26 extends normal to axie 24. Fold-line 12 is arranged to intercept axis 26 at an angle of between 5 and 10 degrees. When blade 10 is folded along fold-line 12, it takes the form depicted in FIG. 1. Blade 10 is formed of a flexible, resilient material which is flow deformable when drawn through water, causing the trailing portions of segments 14, 16 to resiliently deform, aligning in substantial parallelism. Although blade 10 is depicted as having 2 blade segments, it could also be constructed with 3 or more segments.

Turning now to FIGS. 3 and 4, a second form of the fishing flasher is shown generally at 30. A blade 30 includes a fold-line or axis 32 and blade segments 34, 36. Segments 34, 36 include reflective surfaces 38, 40, respectively. Surfaces 38, 40 completely cover segments 34, 36, respectively, in this form of the flasher. Additionally, blade 30 includes an aperture 42, a major axis 44 and a transverse axis 46.

Blade 30, also referred to herein as a lure blade, is generally quarter-moon shaped, having one edge 48 and another edge 50. Edge 48 has a first radius of curvature which is greater than the radius of curvature of edge 50, also referred to herein as a second radius of curvature. Aperture 42 is formed to be adjacent fold-line 32 and to be closer to edge 48 than it is to edge 50.

Turning now to FIG. 5, a fishing lure incorporating blades 10 and 30 is shown, with the blades in a flow-deformed condition, generally at 52. Lure 52 includes a barrel swivel 54 for attaching lure 52 to a fishing line 55. A braided wire leader 56 (0.0025 inch metal rope in the preferred embodiment) extends from a loop 58, which is connected to swivel 54, to a second loop 60. Loops 58, 60 are formed by crimping fittings 59, 61 respectively, to the doubled back leader to secure the loops in place.

A length of leader 56a extends downward from fitting 59 and has a weight 64 secured to its free end. Weight 64 may be a lead split-shot. A weight of ⅛ oz. has been found to be adequate when used with an 18-inch leader having three 4-inch blades mounted thereon. Weight 64 prevents leader 56 from rotating with blades 10 and 30 as the blades rotate on line 56. Leader 56a and weight 64, is also referred to herein as means for inhibiting rotation of a line. This construction eliminates the need for a rudder which is required with conventional trolling rigs.

Lure 52 is shown with three blades, such as blade 10 secured thereon. Line 56 passes through each blade which is secured in place by means of a crimped fitting 66 and plural beads 68. Fittings 66 and 68 provide means for retaining blades 10 in a predetermined axial relationship to each other and to a hook 70. Hook 70 is attached to loop 60 by means of a length of leader 72 and a barrel swivel 74. A series of beads 76 is located between hook 70 and a flasher blade, such as blade 30.

Blades 10 and 30 may be formed by cutting the body of the blades from a planar sheet of flexible and resilient plastic. A preferred material is 10-15 mil Mylar. The body so cut is then folded along its respective fold-line such that the blade segments have unmatching profiles when so folded. The plastic material used is memory sensitive and will retain a predetermined bend when folded sharply. Generally, an angle of 45° is formed between the blade segments, as shown by 14a, 16a in FIG. 5.

When the lure is drawn through a body of water at a trolling speed (7 ft. per second or less), the trailing portions, or free ends of the blade segments in flasher 10, which are remote from the mounting, are deformed or water-flow formed by the water passing over their surfaces such that the reflective surfaces on the blades are brought into substantial parallelism with a set of faces of the segments in an opposed relation.

The blades may be formed with an angle of, for instance, anywhere between 30° and 60°, as desired and the memory sensitive material will retain such a predetermined bend. As the trolling speed is changed, it may be desirable to change the angle between the blade segments to adjust the amount of drag and the amount of deformation of the blade, and hence the lure action as it is drawn through the water. The wider the angle, the more vigorous the action.

Additionally, the blades rotate about leader 56 as the lure is drawn through the water. Blades 10 produce a smooth rotation about leader 56. Because aperture 42 is offset, and because of the shape of blade 30, blade 30 tends to oscillate, or cork screw through the water, simulating what appears to be a swimming bug. As blade 30 oscillates, or orbits, beads 76 and hook 70 similarly follow an orbital path.

Referring now to FIG. 6, a light beam 78 strikes reflective surface 18 and is directed toward reflective surface 20 which in turn directs the beam downward in the water. The presence of opposed reflective surfaces 18 and 20 results in what is referred to as interactive reflection and produces an enhanced down flash.

Although two forms of the invention have been presented, it should be understood that further variations and modifications may be made without departing from the spirit of the invention.

It is claimed and desired to secure by Letters Patent:

1. A fishing flasher comprising:
  an elongate, resilient blade having a transverse fold-line intermediate the ends of the blade defining a pair of substantially equal length blade segments extending divergently outwardly from and to either side of said fold-line, each of said blade segments extending from said fold-line to a free end and the blade segments with the flasher in a relaxed state having flat inner faces and extending in divergent planes thus to form a V-shape with the open end of the V-shape disposed rearwardly in the flasher;
  an aperture extending through said blade adjacent said fold-line which aperture receives line mounting the flasher with the line extending through the aperture;
  said blade segments outwardly of said fold-line being unsupported and being constructed and arranged to resiliently deform with the flasher drawn through the water at trolling speed whereby the blade segments are shaped to have concave inner faces facing each other of decreasing curvature extending from said fold-line and with the free ends of the blade segments substantially paralleling each other, said deforming of the blade segments reducing the drag produced by the flasher on such being drawn through the water.

2. The flasher of claim 1, wherein said blade segments include reflective means on the inner faces of said segments and said reflective means is operable to produce down flash as the blade is drawn through the body of water.

3. The flasher of claim 1, wherein said blade when in a flattened state has a major axis extending between the ends thereof and said fold-line is inclined relative to a line normal to the major axis of said blade at a point midway between its ends.

4. The flasher of claim 3, wherein said fold-line is inclined to said second mentioned line at an angle of about 5°-10°.

5. The flasher of claim 4, wherein said blade is a generally S-shaped structure when in a flattened condition.

6. The flasher of claim 5, wherein said aperture point is located at the midpoint of said fold-line.

7. In combination with a fish hook and a line:
  a fishing flasher comprising a blade of a generally quarter-moon shape having one edge with a first radius of curvature and another edge with a second radius of curvature which is less than the first radius of curvature, said blade having a fold-axis intermediate its end, mounting means mounting said blade on the line located adjacent said fold-axis, said mounting means being located at a point closer to said one edge than to said other edge, said blade being constructed to be flow deformable and to rotate when drawn relative to a body of water and further having reflection means arranged thereon to provide enhanced down flash;

means for retaining said blade in a predetermined axial relationship to the hook and for permitting rotation of said blade relative to the line and the hook; and means for inhibiting rotation of the line with the blade rotating thereon.

8. A flasher comprising an elongate strip of material cut from a planar sheet of flexible and resilient plastic, said strip when cut from the sheet including a mounting portion and a pair of elongate flat-faced blade segments extending in the plane of the sheet and radiating outwardly from opposite sides of the mounting portion, said blade segments terminating in free ends remote from the mounting portion, fold means in said strip of material at said mounting portion shaping the strip whereby such in a relaxed state is V-shaped with said segments extending as flat expanses and forming the legs of the "V" and with the open end of the V-shape facing rearwardly in the flasher, a hole for receiving a line in said mounting portion with the line passing through the hole, said blade segments extending from said mounting portion outwardly and to their said free ends being free of support in said flasher and said blade segments having a flexibility whereby on the flasher being pulled through the water at trolling speed the segments are water-flow formed to curve in parabolic-like curvature about axes paralleling their faces to place said free ends in substantial parallelism and to position a set of faces of the segments in opposed relation, this forming of the blade segments reducing the drag produced by the on being drawn through the water, and reflective surfacing on said set of faces of the blade segments for producing interreactive reflection of light.

9. The flasher of claim 8, wherein the blade segments when water-flow formed have unmatching profiles.

10. The flasher of claim 8 wherein said planar sheet is memory sensitive, retaining a predetermined bend when sharply folded.

11. A fishing flasher comprising:

a blade of generally quarter-moon shape having one edge with a first radius of curvature and another edge with a second radius of curvature which is less than the first radius of curvature, said blade having a fold-axis intermediate its ends defining a pair of blade segments located on either side of said fold-axis, said blade being folded along said fold-axis whereby said blade segments extend outwardly in divergent relatively inclined fashion, a hole extending through said blade located adjacent said fold-axis adapted to have line passed therethrough in mounting of the flasher, and said blade being cut from a sheet of flexible foldable material and prior to folding along said fold-line extending in a plane.

* * * * *